Mar. 27, 1923.
A. S. CAIRNCROSS.
CRYSTALLIZING APPARATUS.
FILED NOV. 30, 1920.
1,449,651.
2 SHEETS—SHEET 1.
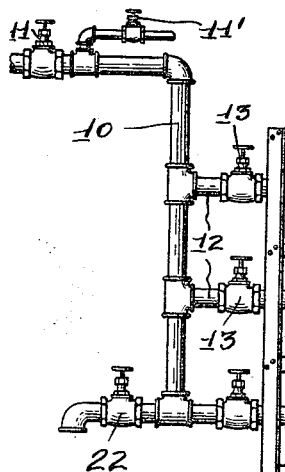
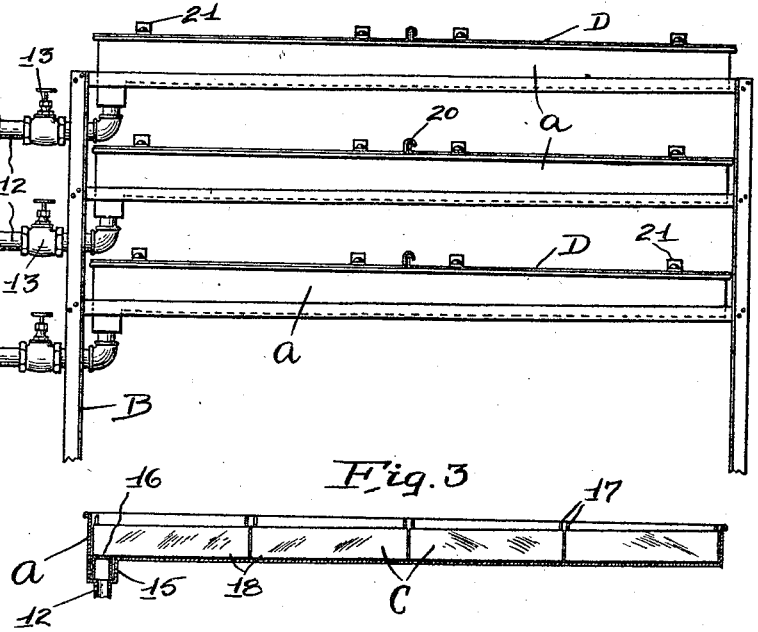
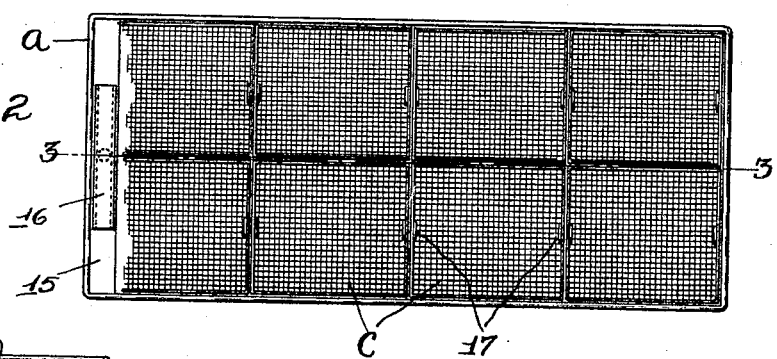
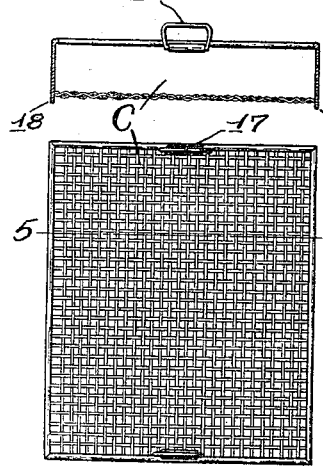
Inventor
Andrew S. Cairncross
By Bradbury + Caswell
Attorneys Mar. 27, 1923.

A. S. CAIRNCROSS.
CRYSTALLIZING APPARATUS.
FILED NOV. 30, 1920.

1,449,651.

2 SHEETS—SHEET 2.

Inventor
Andrew S. Cairncross,
By Bradbury & Caswell
Attorneys

Patented Mar. 27, 1923.

1,449,651

UNITED STATES PATENT OFFICE.

ANDREW S. CAIRNCROSS, OF ST. PAUL, MINNESOTA.

CRYSTALLIZING APPARATUS.

Application filed November 30, 1920. Serial No. 427,301.

*To all whom it may concern:*

Be it known that I, ANDREW S. CAIRN-CROSS, a citizen of the United States, residing at St. Paul, in the county of Ramsey and State of Minnesota, have invented a new and useful Crystallizing Apparatus, of which the following is a specification.

My invention relates to improvements in article crystallizing apparatus, the primary object being to provide effective means for coating candy, cookies or any other articles with an edible crystalline surface, which will protect the candy from becoming sticky when packed in containers and previous to use.

A further object is to provide improved construction which can be operated most efficiently for handling large quantities of candy in the most expeditious and sanitary manner and which can be easily cleaned and surplus crystalline material removed therefrom.

To these ends my invention comprises the features of construction and combination of parts hereinafter described and claimed.

Figure 7:
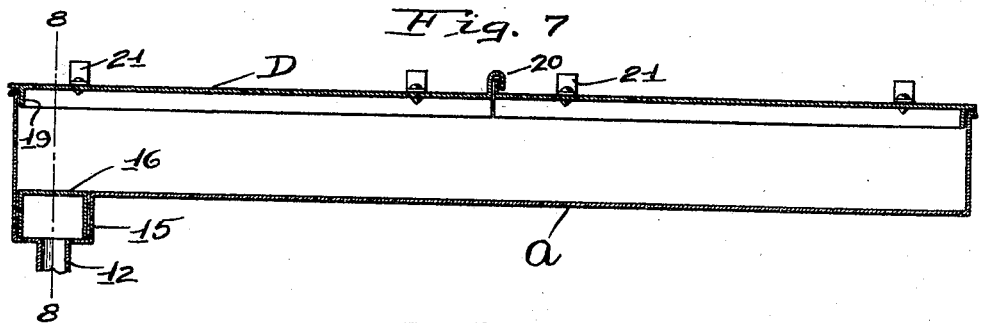
Figure 6:
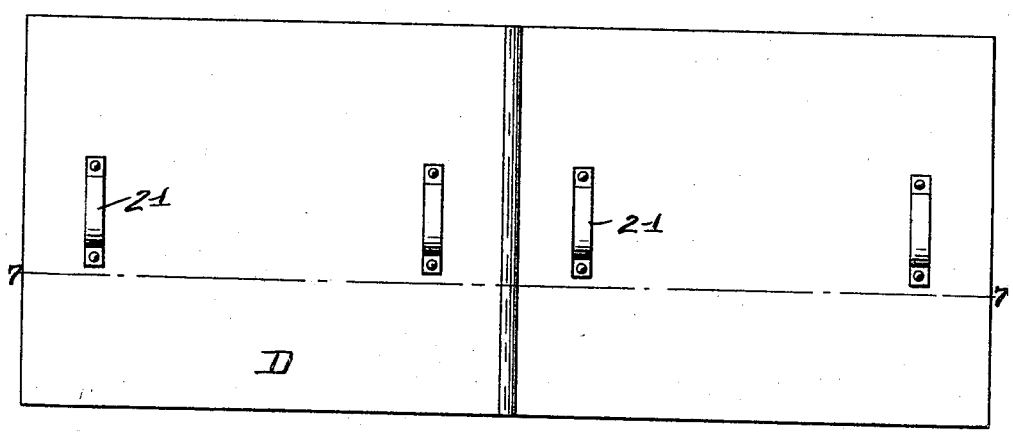
Figure 8:
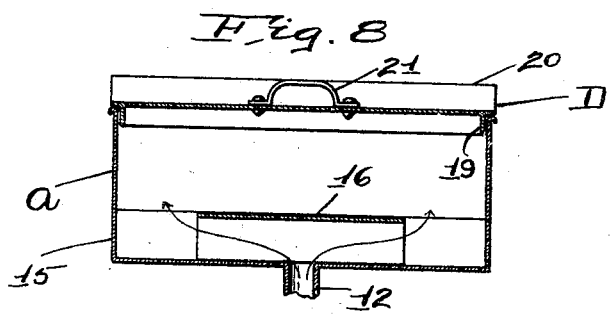

In the accompanying drawings, forming part of this specification, Fig. 1 is a full side elevation of my improved apparatus, it being understood that as many units may be employed as desired, the invention permitting of such divergence; Fig. 2 is a plan view of one of the tray units when the covers are removed and the crystallizing liquid holding receptacle disconnected from the steam supply cleansing system; Fig. 3 is a longitudinal section taken on the line 3—3 of Fig. 2; Fig. 4 is a plan of one of the removable trays for holding the candy to be treated; Fig. 5 is a section taken on the line 5—5 of Fig. 4; Fig. 6 is a plan view of one of the tray units when the cover is adjusted thereon and the crystallizing liquid holding receptacle disconnected from the steam supply cleansing system; Fig. 7 is a longitudinal section taken on the line 7—7 of Fig. 6, and Fig. 8 is a cross sectional view taken on the line 8—8 of Fig. 7.

It is common practice to coat the surfaces of candy with a crystallizing material, which will protect the articles so coated from becoming sticky when standing for an extended period of time and particularly when subjected to damp atmosphere. The crystallizing treatment has been accomplished by immersing the articles to be treated in a solution of sugar and water, or other suitable solution, the period of immersion depending on the desired thickness of the crystalline coating and the crystallizing mixture employed.

In carrying my invention into practice, I employ improved apparatus by which the articles are so treated that an even surface of crystals is formed on the articles and the articles are handled in an expeditious and sanitary manner, whereby a maximum number of articles are treated in a minimum space of time.

This apparatus employs a plurality of superimposed receptacle units spaced upwardly apart, all of which are alike in construction, a description of one, therefore, sufficing. These receptacle units are shallow oblong pans A, held in slightly inclined position lengthwise on a rigid skeleton frame B of any suitable construction. The lower end of each pan A is connected with a drain pipe 10 through a branch connection 12, said pipe 10 being fitted with a controlling valve 11, while each branch connection is fitted with a shut-off valve 13. A crystallizing solution fed by the pipe 10 under control of the valve 11, reaches the pans A through the valved connections 12. Steam directed into the pipe 10 under control of a valve 11' is also conducted to the pans A through said pipe 10 and connections 12. Each pan has a transverse gutter 15 across the lower end of its floor, draining into the branch connection 12 and above this gutter is a guard 16 which distributes the crystallizing solution and steam evenly and causes the liquid contents of the pan to drain laterally towards the side of the pan and into the opposite ends of the gutter, thereby promoting more even distribution of the liquid crystallizing solution throughout the pan and over the surfaces of the articles being coated.

A plurality of shallow article supporting trays C are so shaped as to nest closely in the pan on its floor, each tray being made of open work material, such as wire screening or any other perforated material, whereby the articles on the trays may be immersed in the crystallizing solution and allowed to stand. Each tray is provided with suitable handles 17 by which it can be lifted into and out of the pan and its lower edges 18 are made to project slightly below the floor of the tray so that the floor of the tray is held slightly spaced above the floor of the pan to permit the crystallizing solution to pass freely below the tray. The trays rest below the top of the pan and the pan is provided with sectional covers D, the edges of which are flanged downwardly at 19 to slip tightly into the pan and the adjacent edges of which have a tongue and groove separable connecting joint 20 for the same purpose of assisting in closing the pan tightly. Handles 21 on the cover section facilitate handling and manipulating the cover.

In use, the valve 11' and the valve 22, which is placed in the lower outlet end of the trunk pipe 10 below the branches 12, are closed. The crystallizing solution supply valve 11 is then opened until the pans A are filled with a solution of suitable crystallizing material to a depth in each pan sufficient to cover the articles to be treated in the pans. Articles to be treated are then placed on the trays C and the loaded trays placed in the crystallizing solution in the pans. The covers D are then adjusted over the pans and the articles allowed to stand sufficiently long to be coated with crystals to the desired extent. The loaded trays are then removed and the articles allowed to stand until dry, after which they are ready to be removed and packed for shipment. The covers can be replaced in the pans and steam allowed to enter by opening the valve 11', thus dissolving all crystalline deposit on the surfaces of the pans and trays in the pans, after which the solution can be drained away by opening the valve 22. The deflector or weir 16 causes the steam or hot dissolving liquid to travel into the lower corners of the pan, where all of the crystallized material is dissolved and removed, which might otherwise collect and dam up the outlets leading through the weir.

Having described my invention, what I claim as new and desire to secure by Letters Patent is:

1. Crystallizing apparatus comprising, in combination, a plurality or battery of pans, trays of open work material for said pans, a cover for each pan, a source of supply of crystallizing solution, a source of supply of cleansing fluid, a combination feed and drain conduit, common to all of said pans and communicating with both sources of supply, and valves associated with said conduit and adapting the same to serve, selectively, as a medium for feeding crystallizing solution into said pans, a medium for feeding cleansing fluid into the pans and as a drain for said pans.

2. Crystallizing apparatus comprising, in combination, a pan adapted to hold a crystallizing solution, a frame upon which said pan is supported with its floor in inclined position, a plurality of trays of open work material supported within said pan to hold articles to be treated in said solution, a cover removably supported over said pan, said pan being formed with a drain gutter at the lower end of its floor, a medial guard over said gutter and a valved inlet and outlet duct connected with the gutter below the guard, said duct being in communication with two sources of supply, one a crystallizing solution and the other a cleansing fluid, and also in communication with a drain duct, said guard being adapted to deflect and distribute the incoming fluids, and to cause the contents of the pan to drain laterally toward the sides thereof.

3. Crystallizing apparatus comprising, in combination, a skeleton frame, a plurality of superimposed shallow pans supported by said frame with their floors pitched to drain, gutters at the lower ends of said pans into which the floors drain, ducts connected with said gutters, said ducts being in turn connected with a valved steam supply duct and with a valved drain duct for the purposes specified.

4. Crystallizing apparatus comprising, in combination, a battery of pans, a conduit common to all of the pans, valved branches reaching from said conduit to said pans and bringing the latter into individual communication with the former, a source of supply of crystallizing solution, a source of supply of cleansing fluid, each source being individually communicable with the conduit, said conduit serving as a feeding element to said pans for each medium communicable thereto and serving also as a drain from said pans.

5. Crystallizing apparatus comprising, in combination, a battery of pans, a conduit common to all of the pans, valved branches reaching from said conduit to said pans and bringing the latter into individual communication with the former, a source of supply of crystallizing solution communicable to the conduit, said conduit serving as a feeding element to each of the selected pans brought into communication therewith and also serving as a drain from said selected pans.

In testimony whereof, I have signed my name to this specification.

ANDREW S. CAIRNCROSS.